(12) United States Patent
Kashter et al.

(10) Patent No.: US 12,007,559 B2
(45) Date of Patent: Jun. 11, 2024

(54) MULTI-LAYERED THIN COMBINER

(71) Applicant: Spectralics Ltd., Tel Aviv (IL)

(72) Inventors: Yuval Kashter, Tel Aviv (IL); Eran Falek, Netanya (IL); Ran Abraham Bar-Yosef, Tel Aviv (IL)

(73) Assignee: Spectralics Ltd., Tel Aviv (IL)

( * ) Notice: Subject to any disclaimer, the term of this patent is extended or adjusted under 35 U.S.C. 154(b) by 0 days.

(21) Appl. No.: 17/356,818

(22) Filed: Jun. 24, 2021

(65) Prior Publication Data

US 2021/0325673 A1 Oct. 21, 2021

Related U.S. Application Data (63) Continuation of application No. PCT/IL2019/051404, filed on Dec. 24, 2019.

(60) Provisional application No. 62/784,575, filed on Dec. 24, 2018.

(51) Int. Cl.
*G02B 27/01* (2006.01)
*G02B 27/14* (2006.01)

(52) U.S. Cl.
CPC ....... *G02B 27/0101* (2013.01); *G02B 27/142* (2013.01); *G02B 2027/0194* (2013.01)

(58) Field of Classification Search
CPC ............ G02B 27/0179; G02B 27/0176; G02B 27/0172; G02B 27/017; G02B 27/0149; G02B 27/01; G02B 27/142; G02B 27/0101; G02B 2027/0194; G02B 2027/013
USPC ............ 359/583, 462–477, 629–633, 13–14; 349/15, 11; 348/51–60, 42, 115
See application file for complete search history.

(56) References Cited

U.S. PATENT DOCUMENTS

| | | | |
|---|---|---|---|
| 4,968,117 A | 11/1990 | Chern et al. | |
| 6,236,511 B1 * | 5/2001 | Brown | G02B 3/08 359/742 |
| 6,671,100 B1 | 12/2003 | McRuer | |
| 10,663,627 B1 * | 5/2020 | Jia | B05D 1/005 |
| 2002/0171940 A1 * | 11/2002 | He | G02B 27/01 359/630 |
| 2003/0165017 A1 * | 9/2003 | Amitai | G02B 27/0172 359/636 |
| 2010/0118276 A1 | 5/2010 | Li | |
| 2012/0307370 A1 | 12/2012 | Bhatia et al. | |
| 2014/0126029 A1 | 5/2014 | Fuetterer et al. | |

(Continued)

FOREIGN PATENT DOCUMENTS

JP 2018-144648 9/2018
WO WO 2013/130198 9/2013

OTHER PUBLICATIONS

International Search Report and Written Opinion for PCT Application No. PCT/IL2019/051404, dated May 7, 2021.

(Continued)

*Primary Examiner* — Travis S Fissel
(74) *Attorney, Agent, or Firm* — PEARL COHEN ZEDEK LATZER BARATZ LLP (57) ABSTRACT

A multi-layered thin combiner (MLTC) is provided herein. The MLTC may include: a plurality of connectable layers each having a separate active area coated with a primary partially reflective filter; wherein each active area comprises a discrete fraction of an effective aperture; and wherein the active areas are configured to align, when said connectable layers are connected, to collectively define a complete effective aperture.

6 Claims, 10 Drawing Sheets

(56) References Cited

U.S. PATENT DOCUMENTS

2018/0011322 A1*  1/2018  Leighton ............ G02B 27/0172
2018/0212330 A1   7/2018  Wertsberger
2018/0231786 A1   8/2018  Ouderkirk et al.
2019/0004325 A1*  1/2019  Connor .............. G02B 27/0172
2019/0346675 A1* 11/2019  Yoshimura ........... H04N 9/3129

OTHER PUBLICATIONS

Extended European Search Report for EP Patent Application No. 19905899, dated Jan. 18, 2022.

* cited by examiner

MULTI-LAYERED THIN COMBINER

CROSS-REFERENCE TO RELATED APPLICATIONS

This application is a continuation of PCT Application No. PCT/IL2019/051404, filed on Dec. 24, 2019, which claims priority from U.S. Provisional Patent Application No. 62/784,575 filed on Dec. 24, 2018, both are incorporated herein by reference in their entireties.

FIELD OF THE INVENTION

The present invention relates generally to a multi-layered thin optical combiner configured to augment a real-world view with virtual images, and more particularly to such arrangements operable to overlay graphics and/or data onto a wholly undistorted and unmodified real-world view.

BACKGROUND OF THE INVENTION

Augmented reality (AR) refers to techniques whereby a real-world view, object or scene as seen by an observer is enhanced with an additional visual layer of digital information. AR is known to be advantageous in circumstances where it is desirable to pair (e.g., conformally) essential digital information with natural information in the locality/surroundings. The notion of AR is not new; however, the prevalence of AR has increased significantly in recent years owing to field advances and the obviation of technological constraints. As a result, AR is now readily employed in a wide variety of applications, most notably including those in the automotive, avionics, transportation, gaming and navigation industries. In particular, AR has seen significant development in relation to head-up displays (HUD) and is now readily employed in, for example, airplanes, cars, and the like, in addition to near-eye displays on head mounted instruments (e.g., smart glasses or AR helmets), advanced rifle sights, etc.

Of the AR systems currently in use, two general approaches to implementation have emerged. The first, often referred to as the 'video see-through' (VST) approach, involves capturing and digitizing a 'real-world' view using a camera, enhancing the real-world view by adding overlaying graphics directly to the data, and then displaying the composite real-augmented digital data on some form of an opaque display, such as a TV or mobile phone screen. The second, often referred to as the 'optical see-through' (OST) approach, involves the observer maintaining a physical view of the 'real-world' through some form of a transparent element, such as an optical combiner or a window, and then augmenting the view by rendering overlaying graphics directly onto the transparent element between the observer and their real-world view.

The latter of these approaches, namely the OST approach, is generally considered to be the go-to choice for future innovation in the AR field due to superior usability potential. The VST approach, by contrast, is more limited in that it necessitates potentially costly data capturing components, often entails a greater amount of data processing and manipulation, and further has the potential for image quality degradation. In addition, it does not provide a natural scene. The digital acquisition of the outside scenery resulting in a flat two-dimensional image. The challenges entailed with the OST approach are however greater, particularly as a consequence of needing to render and project virtual data. The OST approach is also generally dependent on optical components, such as lenses, mirrors and prisms, each of which have rigid properties that may lead to data stream bottlenecks between the system and the observer.

Implementation of OST AR systems typically requires the use of an optical enabling device (i.e., an optical imaging system) to display virtual objects directly into the observer's field of view (FOV). These devices are especially vital where there is a need for virtual objects to be aligned with, or to overlap with, objects or scenery in the real-world view. Standard optical enabling devices are based on two channels, the first being a transmissive channel operable to enable an observer to view a real-world scene without optical modulation (i.e. without modification, magnification or distortion), and the second being a virtual channel operable to obtain data (e.g. computer generated digital data of a textual or graphical variety) from an external source and to project it to the observer in alignment with the real-world scene. The transmissive and virtual channels are generally superimposed (i.e., combined and aligned) using an optical combiner on which a partially reflective filter is deposited, such as a beam splitter, a dichroic mirror, or a notch filter, said combiner being positioned along the optical path between the observer and scene (i.e. positioned as an optical-incident surface).

Figure 1A:
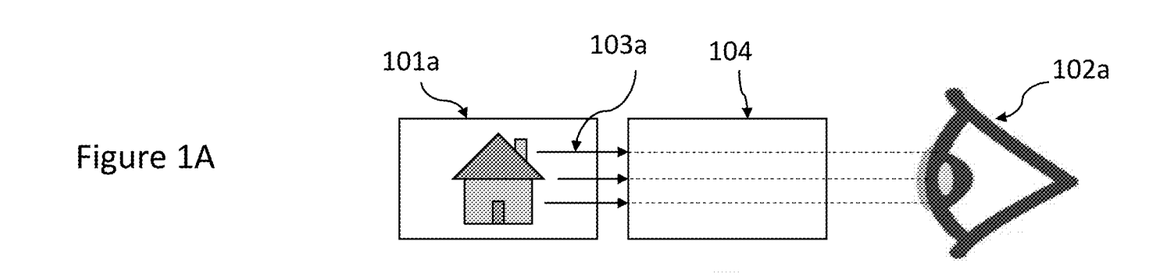
FIGS. 1A, 1B, and 1C are schematic diagrams illustrating exemplary architecture and functionality in a standard OST AR system.
Figure 1B:
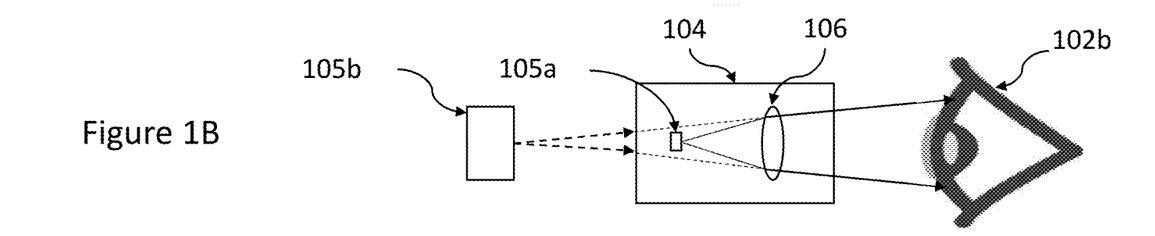
Figure 1C:
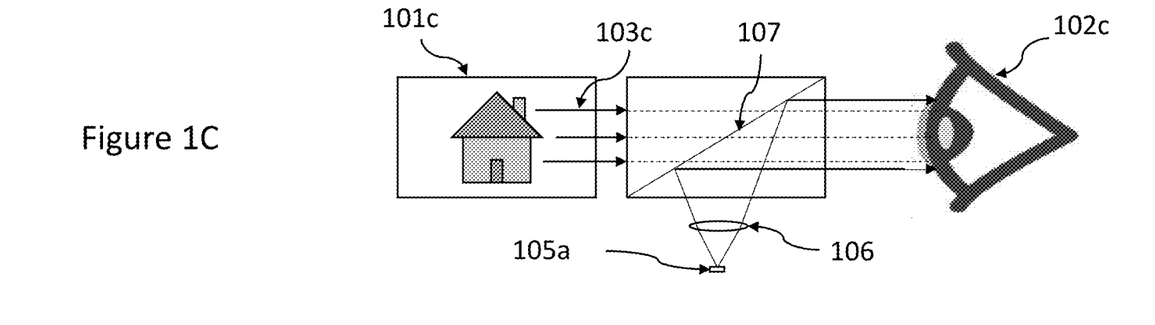

An exemplary OST AR system is illustrated in FIG. 1 wherein the transmissive channel is depicted in FIG. 1a, the virtual channel is depicted in FIG. 1b, and the combined transmissive-virtual channel is depicted in FIG. 1c. In the case of the transmissive channel, light rays 103a from the real-world view 101a are transmitted via AR system 104 to the eyes of an observer 102a without modification or distortion. In the case of the virtual channel, additional data 105a for augmentation with the real-world view is defined within AR system 104, is imaged via imaging lens (or aspheric mirror) 106 to have appropriate virtual image characteristics 105b (i.e. appropriate magnification, transverse location and axial distance for alignment with the real-world view), and then projected to the eye of the observer 102b. In the case of the combined transmissive-virtual channel, light rays 103c from the real-world view 101c pass unmodified via the beam splitter 107 to the eye of the observer 102c, and data 105a defined by the AR system is projected and focused via imaging lens (which might represent lenses arrangement) 106 onto an alternative surface of the beam splitter 107 (which may have an antireflective coating) and aligned with the real-world view into the eye of the observer 102c.

OST AR systems are typically constrained in their application owing to limitations arising from the physical size of the optical components (e.g., imaging lens, beam splitter). Specifically, the physical size of the imaging lens places constraints on the size of the exit pupil, and this consequently also dictates the effective area in which an observer's eyes are capable of capturing projected virtual images (known as the 'eye-motion-box' or EMB). In essence, the smaller the physical size of the imaging lens, the smaller the EMB and therefore the smaller the area in which projected data refracted from the optical combiner (i.e. beam splitter et al.) can be rendered in the observer's eye.

The aforementioned limitations are known to cause particular difficulties in OST AR systems employing gaze-tracking technology, or indeed in analogous systems monitoring mechanical movements. They are also particularly problematic in situations where it may be desirable for the optical combiner to be embodied as a large transparent surface (e.g. embodied as a HUD/windscreen/windshield in a vehicle). In such situations, the imaging lens either needs to be comparable in size to the large transparent surface so as to exhibit the requisite exit pupil, or else defines only a small effective area on the large transparent surface in which an observer may see projected images. The practicality of installing a large imaging lens is generally cost prohibited, lacking in feasibility, and may necessitate undesirable modification to the mechanical interface of the HUD's surroundings (e.g., undesired changes in the driver's cabin geometry). As a consequence, existing OST AR systems mostly present either with small effective areas (i.e., present only on a fraction of the full area of the windscreen), or with incomplete and/or fractured effective areas.

Figure 2A:
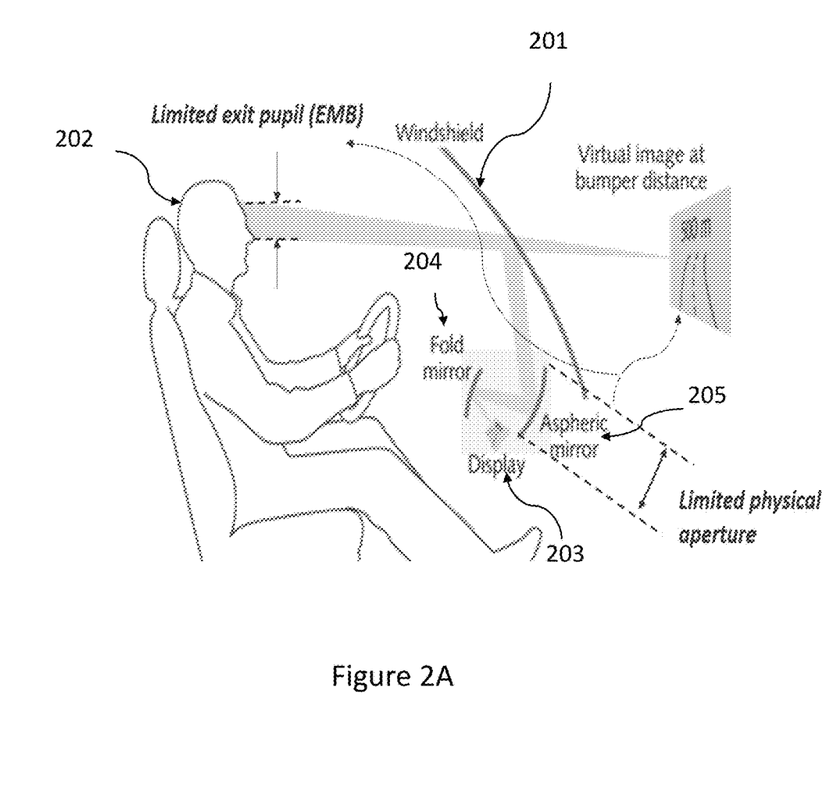
FIGS. 2A and 2B are schematic diagram illustrating exemplary architecture and functionality in a vehicle-based windshield HUD arrangement.
Figure 2B:
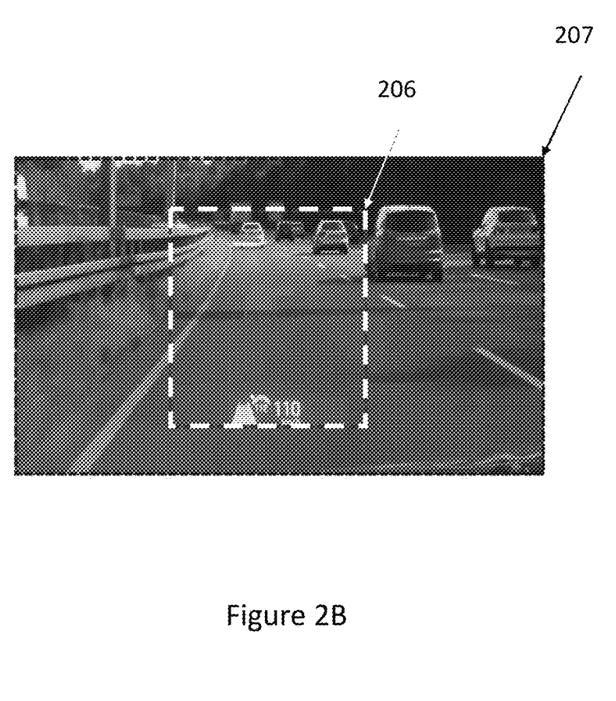

A schematic depiction of these limitations is illustrated generally in FIG. 2 where an exemplary vehicle-based windshield HUD is proposed. Digital/AR content for projection onto the windshield 201 in front of the driver 202 is derived and emitted by an overlay display device 203. The content is pathed via a fold mirror 204 and an aspheric mirror 205 and subsequently transmit the incident light said line of sight in an angle of approximately 60°, relatively to the normal of the windshield 201, to produce an image in front of the driver 202, where the typical magnification is 5×-6×. As the EMB is dictated by the aperture size of the optical component immediately preceding projection (i.e., aspheric mirror 205), the resultant field of display (FOD) 206 is substantially smaller than that of the scene FOV 207 visible through windshield 201.

It is therefore an objective of the present invention to propose a means by which optical power and functionality may be conferred to a large transparent surface (e.g., a windscreen) in such a manner that an optical channel is established between the observer and the system on the internal surface and where transparency of the surface is preserved (i.e., where the real-world view may be observed without visual distortions or artifacts). Accordingly, a multi-layered thin optical combiner is proposed, said multi-layered thin optical combiner being operable to transmit incident light from a real-world view without modulation, and further modulate light projected from an overlay data system so as to align with said real-world view.

SUMMARY OF THE PRESENT INVENTION

A multi-layered thin combiner ("MLTC") is disclosed herein. The MLTC comprises: a plurality of connectable layers each having a separate active area coated with a primary partially reflective filter; wherein each active area comprises a discrete fraction of an effective aperture; and wherein the active areas are configured to align, when said connectable layers are connected, to collectively define a complete effective aperture.

Advantages of the present invention are set forth in detail in the following description.

BRIEF DESCRIPTION OF THE DRAWINGS

For a better understanding of the invention and in order to show how the invention may be implemented, references are made, purely by way of example, to the accompanying drawings in which like numerals designate corresponding elements or sections. In the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

The following term definitions are provided to aid in construal and interpretation of the invention.

The term "notch filter" refers generally to an optical filter, possibly a narrowband filter, that has been configured to selectively reflect and/or absorb a portion of the electromagnetic spectrum (i.e., a spectral bandwidth around a specific wavelength) while transmitting all other wavelengths without, or with minimal/infinitesimal, modulation and/or distortion. It is noted that the use of any partially reflective coating can replace a "notch filter" in any embodiment of the present invention disclosed herein.

The term "beam-splitter" refers generally to an optical device configured to split an incident light beam into two or more light beams having identical or differing radiation power. The terms "combiner" or "optical combiner" refer generally to an optical device configured to merge two or more light beams into a single, possibly unified, light beam. In the present context, a combiner may be employed to merge a virtual image, possibly originating from a data overlay device, with a real-world image (i.e., light originating from a scene/environment) such that virtual data is perceived (e.g., by a user) to be aligned, possibly conformally, with features within the real-world.

The term "active area" refers generally to the portion and/or fraction of an item/article which fulfils an optical function when utilized. In the present context, an active area may refer to the portion of a layer in a MLTC which has been modified (e.g., as a result of a notch filter coating) to perform, alone or in combination with other layers, an optical function (e.g., polarization, reflection, modulation, or the like). An active area is typically formed as a continuous undistributed shape, for example in the form of a circular or elliptical ring, and may align with other active areas in other layers to collectively form a composite aperture/interface.

The term "effective aperture" refers generally to the total area/sum of areas through which electromagnetic radiation (e.g., light) may travel. In the present context, the effective aperture is created by the composite of, for example, circular/elliptical sub apertures that are arranged in the form of a multilayered structure. The size of the effective aperture and the focal length of an optical system may collectively dictate the cone angle of rays focused in the image plane of that optical system (also known as "Numerical Aperture" or NA of the system).

Figure 3A:
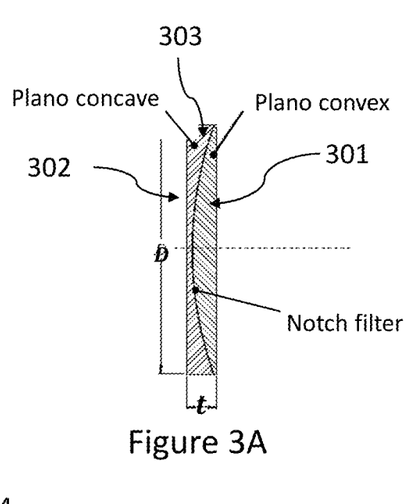
FIGS. 3A, 3B, 3C, and 3D are schematic diagrams and graphs illustrating exemplary architecture and functionality in a standard doublet lens.
Figure 3B:
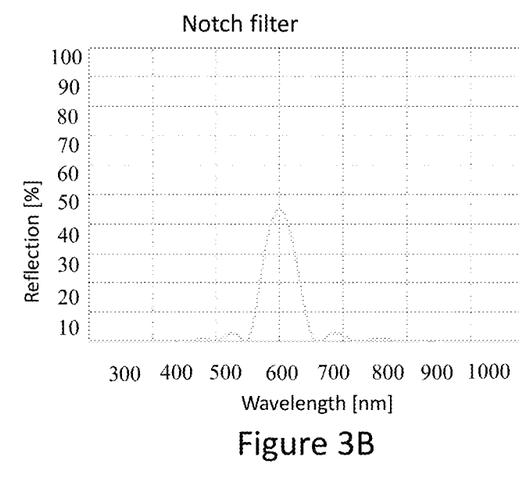
Figure 3C:
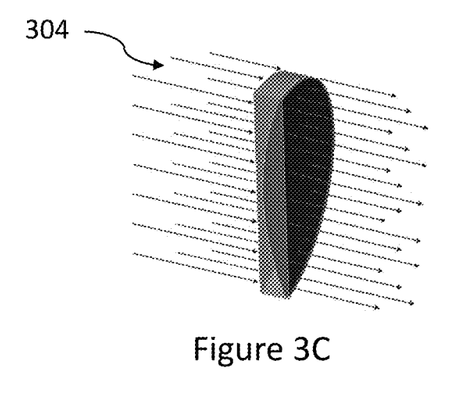
Figure 3D:
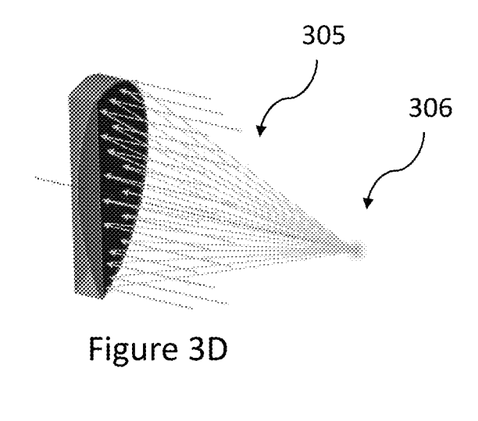

A number of arrangements are known in the art and have been devised for the purposes of applying optical power to the 'internal surface' of an optical combiner (i.e., by bending/modulating incident light on a 'Virtual Image'/VI channel) such that light from the 'See Through'/ST channel remains substantially unaffected. FIG. 3A, for example, illustrates an exemplary optical combiner comprising two cemented/connected lenses (with the same refractive index) formed as a doublet lens with zero optical power (i.e., a 'perfect' window). The exemplary doublet lens comprises a substantially planoconvex lens element 301 cemented/connected with a substantially planoconcave lens element 302, the curved boundary or mutual surface 303 having a reflection-based notch filter coating. The reflection-based notch filter in this exemplary arrangement is, as illustrated in FIG. 3B, configured in relation to the central wavelength of the VI channel and is operable to reflect light at around 600 nm with an efficiency of 47%. As shown in FIG. 3C, light rays 304 from the real-world scene accordingly pass through the doublet lens absent spatial modulation owing to the lens having uniform thickness. Conversely, as shown in FIG. 3D, light rays 305 originating from the 'internal side' of the double lens, for example from an AR/data overlay source, are reflected by the reflection-based notch filter coating on the mutual surface 303, modulated, and converged to a single focal point 306.

Doublet lenses may thus be configured to behave, in part, like a window, the window being operable to transmit light arriving from an external scene without distortion or modulation. The doublet lens may also simultaneously be configured to behave like a concave mirror, the mirror being operable to reflect rays projected from an AR/data overlay source onto the opposite, internal, side of the doublet lens back to an observer. The transmitted unmodulated 304 and reflected modulated 305 rays may thus be configured to arrive in alignment at the eye of an observer. The challenges in producing doublet lenses, and in particular those with a-spherical curved features, for example a free-form surface, are however significant with current manufacturing methods, and furthermore prohibitively expensive. Further, where there is a need to modulate light incident at larger angles, for example in circumstances where the optical combiner is tilted at a significant angle relative to an AR/data overlay projecting unit (known as an 'off-axis optical system'), the production of a very large a-spherical surface (or 'free-form optical surface') is necessitated. As a result, the total thickness of the combiner increases dramatically. Owing to the resultant thickness of such components, the ability to integrate doublet lens optical combiners into, for example, the windshield of a vehicle is typically unviable. In practice, therefore, doublet lenses are known to have limited applicability and are typically restricted for use in relation to instruments/surfaces that are generally small in size/dimension.

Alternative arrangements that are known in the art include the so-called 'holographic combiner' which features a gelatin layer, generally embedded between two glass plates, that is illuminated/irradiated by a laser beam to create a volume hologram. Nowadays, the use of polymers can replace the glass-gelatin arrangement. These arrangements are complicated and provide a relatively low reflection efficiency owing to their sensitivity to wavelengths, in particular when dealing with large incident angles. As a result, the hologram when exposed to the ambient light might cause optical artifacts in the form of rainbow effects and turbidity in the ST (known as the Milky Way phenomena). Additionally, the reflection efficiency of volume holograms is relatively limited, in particular when dealing with large angles. In the special case of a hologram that is employed as an optical combiner for a windshield based HUD, the above mentioned 60° angle relatively to the projecting unit might results in a poor reflection efficiency due to the given large angles. A so-called 'sandwiched diffractive optical combiner' has also been proposed by Google INC in International Publication Number WO 2013/130198 A1. This and similar Diffractive Optics Element (DOE) arrangements generally entail coating a Fresnel lens with a selective reflective coating (i.e., a notch filter) using, for example, the fabrication methods illustrated in FIG. 4 of the aforementioned publication number. As will be explained in further detail below (see FIG. 5 and related discussion), DOE arrangements, and in particular those employing Fresnel architecture, invariably feature unconcealable geometrical discontinuities which perceptibly disrupt the aesthetics/continuity of the ST channel.

Figure 4A:
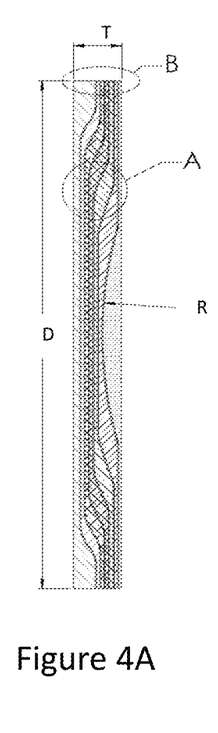
FIGS. 4A, 4B, 4C, 4D, 4E and 4F are schematic diagrams illustrating exemplary non-limiting architecture of an MLTC according to embodiments of the present invention.
Figure 4B:
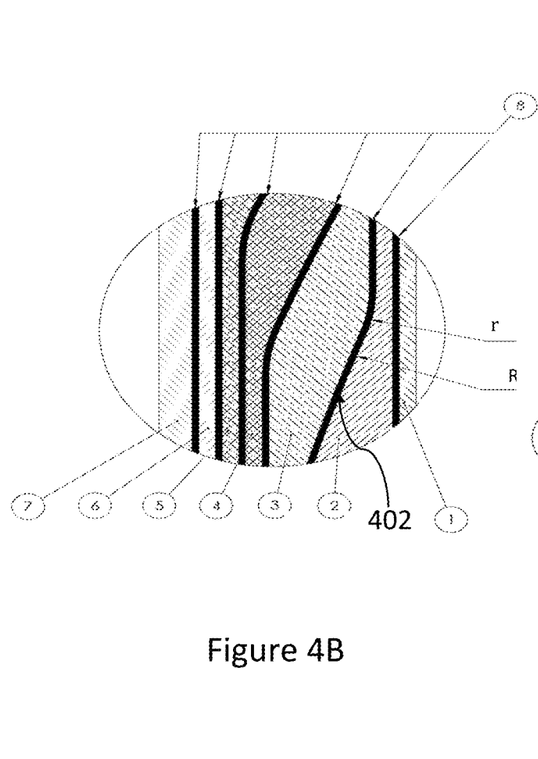

In order to overcome these deficiencies and maintain aesthetics/continuity in the ST channel (i.e., to preclude any visual perception of optical artifacts), an MLTC comprising continuous geometry is proposed. FIGS. 4A-4D are schematic diagrams illustrating such a multi-layered optical combiner according to embodiments of the present invention. In particular, FIGS. 4A 4D show a thin composite optical combiner comprising multiple discrete layers 401 formed/made from a transparent dielectric material (e.g., glass, Fused Silica, polymers with optical properties etc.) which are adhered/cemented together using an index matching adhesive agent (e.g., Norland NOA 76 with a refractive index of 1.51, which is appropriate to nbk7 glass) to form a composite structure. In contrast to the aforementioned DOE arrangement (which involves a segmented optical element featuring optical/geometrical discontinuities), an adhered/ cemented multi-layered arrangement with exceptionally thin layers (e.g., ~1 mm per layer) has been found to be advantageous owing to a lack of geometrical/optical discontinuities. Each of the discrete layers 401 further features an active area 402 (i.e., an active incident area which may be, for example, a fraction of an aspherical concave mirror/freeform surface) which contributes, possibly when combined with other discrete layers, to form the effective aperture of the optical combiner/lens.

Figure 4C:
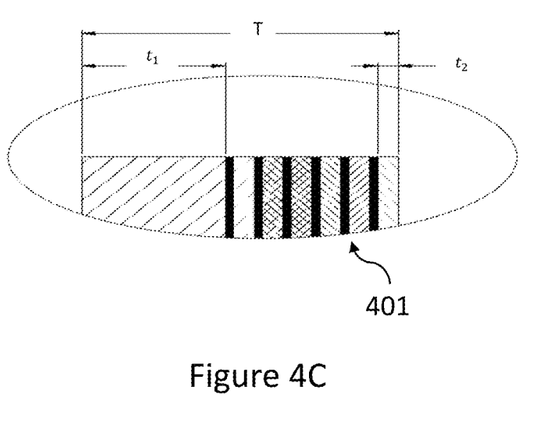
Figure 4D:
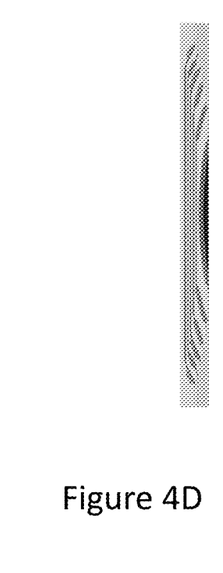
Figure 4E:
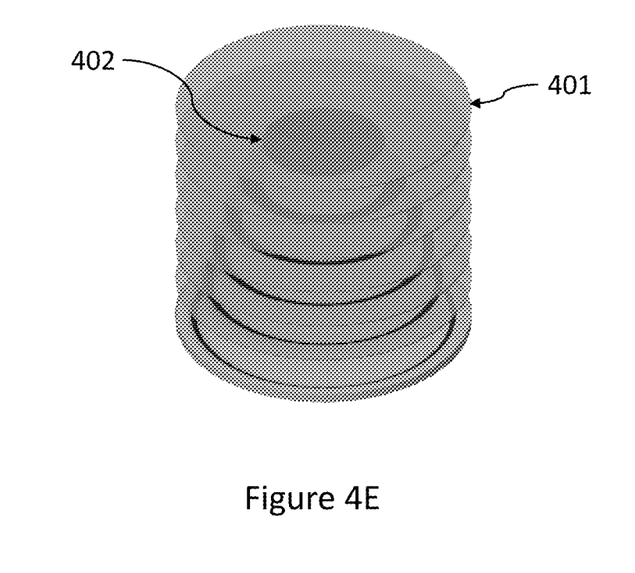
Figure 4F:
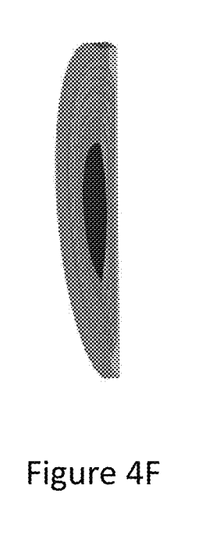
Figure 5A:
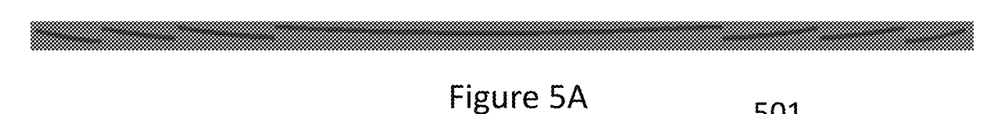
FIGS. 5A and 5B are schematic diagrams illustrating an architectural comparison between embodiments the present invention and known prior art.
Figure 5B:
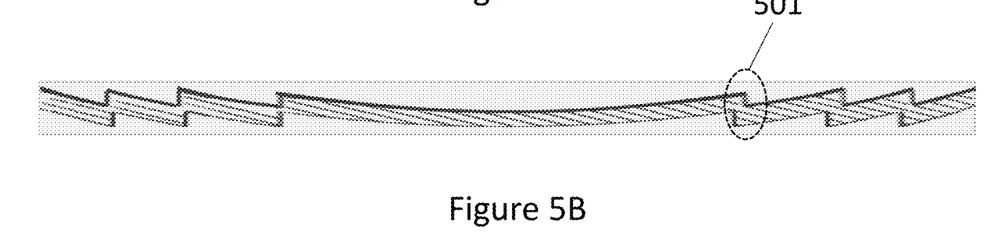

As shown in FIG. 4C, the optical combiner may further comprise a 'host element' having a thickness t1 to which one or more layers 401, each having a thickness t2, may be adhered/cemented in a peripheral area (i.e., beyond the effective region) resulting in a total thickness T of the optical combiner. Additionally, as shown in FIG. 4B, each active area (depicted here as fractions of a spherical concave surface, similar to a Fresnel magnified mirror) may be considered to have a respective radius 'R' of the 'active surface' (i.e., the concave spherical incident surface) and tangent radii 'r' of the structure. In order to create the active area in each layer, each spherical concave radius 'R' is coated by a partially reflective filter (similar to the aforementioned Doublet lens) and subsequently assembled, in combination with other layers, to form a composite structure, as shown in FIG. 4Be (where the dark areas shown in FIGS. 4A and 4D-4F represent the active surfaces that are coated with a partially reflective filter (e.g., a notch filter). The resultant multi-layered optical combiner structure, as shown in FIG. 5A, may thus be said to provide a 'Floating Filter' embedded within a continuous media. By contrast, the DOE combiner, as shown in FIG. 5B, has been found to feature geometrical/optical discontinuities 501 in every pass between segments. As these geometrical discontinuities may be perceived by users/observers (e.g., as optical vignetting, distortions and/or scattering in the ST channel), the proposed multi-layered optical combiner is particularly advantageous for the purposes of preserving aesthetics in the ST channel, due to the fact that the geometric continuity is maintained by the multi-layered unique structure.

Figure 6:
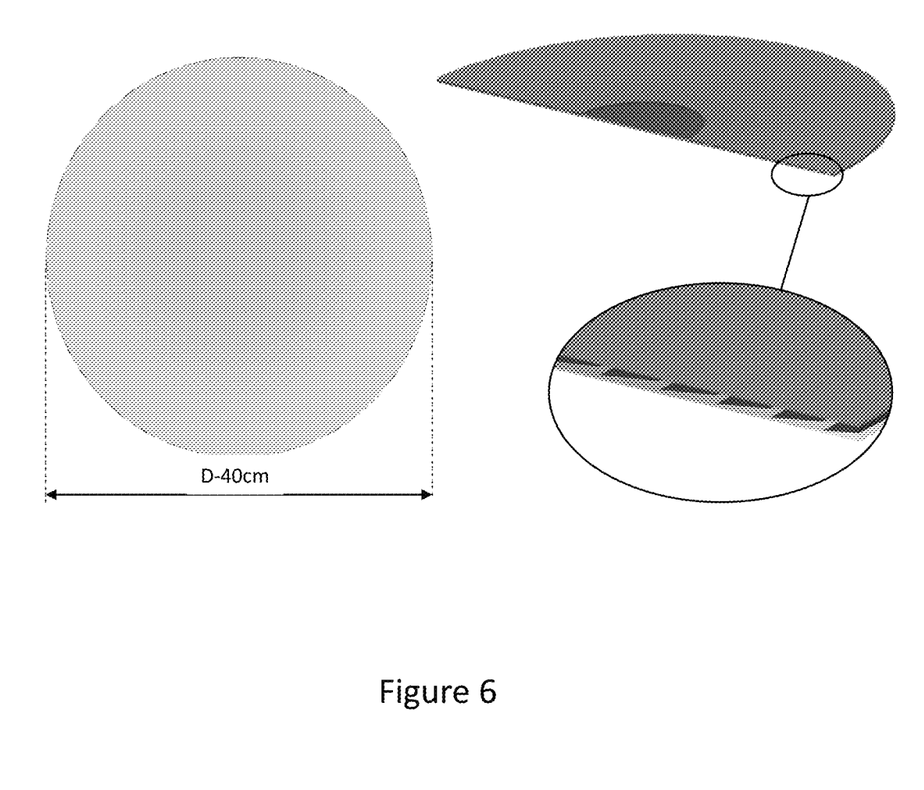
FIG. 6 is a schematic diagram illustrating exemplary non-limiting architecture of a multi-layered optical combiner according to embodiments of the present invention.

An example of a fully constructed/connected multi-layered optical combiner is shown generally in FIG. 6. In this case, an optical combiner comprising 12 layers (i.e., 11 active areas/segments) is shown with an outer diameter D of 40 cm and an effective focal distance of 75 cm. The 'host element' t1 has a thickness of 2.1 mm and each layer t2 has a thickness of 0.05 mm, resulting in a total thickness T of 2.8 mm. The geometry/dimensions of this multi-layered 'thin' optical combiner are thus engineered to obviate geometrical discontinuities while retaining applicability for integration onto/into any transparent surface (e.g., such as a windshield, or the like).

Figures 7A, 7B:
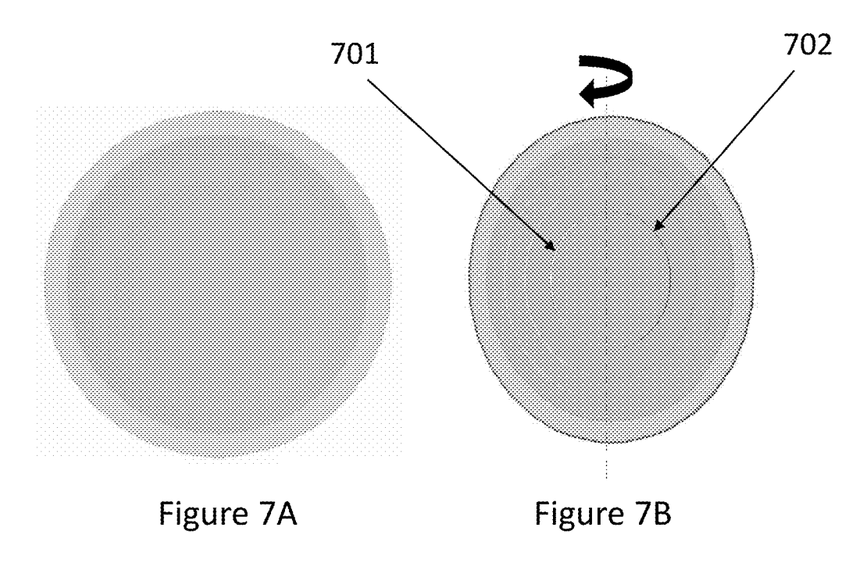
FIGS. 7A and 7B are schematic diagrams illustrating non-limiting architecture and functionality of an MLTC according to embodiments of the present invention.

Notably in some circumstances, for example where the aforementioned MLTC is viewed by an observer/user at an angle (i.e., not perpendicular to the plane of the combiner), passes between the segments/layers may become visible. This issue is illustrated generally in FIGS. 7A and 7B, in particular where FIG. 7A depicts the aforementioned MLTC as perceived by an observer/user when viewed 'head on' (i.e., when the combiner is positioned perpendicular relative to the gaze/line of sight of an observer). In this case the multi-layered optical combiner appears fully transparent with no visible discontinuities. By contrast, FIG. 7B depicts the aforementioned multi-layered optical combiner as perceived by an observer at an (e.g., acute or obtuse) angle of incidence (i.e., not perpendicular to the plane of the combiner). In this case, the passes between the segments/layers become visually perceptible, possibly in the form of clearance zones 701 (which may appear as bright regions) and/or overlap zones 702 (which may appear as dark regions). Unlike the geometric discontinuities visible in DOE arrangements however (i.e., which may lead to modulation in the form of optical vignetting, distortions and/or scattering), discontinuities arising due to viewing angle in multi-layered optical combiners (i.e., due to the 'Floating Filter' arrangement) are relatively minor (albeit undesirable) and may only cause localized tinting/discoloration. In case beam splitter is used it will be darker and brighter areas.

Two approaches to address and obviate these tinting/discoloration discontinuities are proposed generally in FIGS. 8A-8F. Common to both approaches is an exemplary OST AR system arrangement where a multi-layered optical combiner has been applied to the surface of a large transparent window. As aforementioned, the optical functionality of the multi-layered optical combiner is such that the transparency of the carrier/host surface, in this case a large transparent window, is preserved thereby permitting transmission of an unmodulated channel of light 803 from the real-world scene to the user/observer 805. This is achieved as light incident upon the external bounding surface (i.e., the surface closest to the real-world scene) is wholly unaffected by the notch filter applied to the multi-layered optical combiner (i.e., the active areas in each layer). Virtual light/data 804 incident upon the internal bounding surface (i.e., the surface closest to the user 805) is, however, modulated owing to the Notch filter and is reflected to the user 805. Unmodulated light 803 from the real-world scene and modulated light 804 from the virtual data light source are thus combined, aligned, and perceived by the user 805 as a single composite view.

Figure 8A:
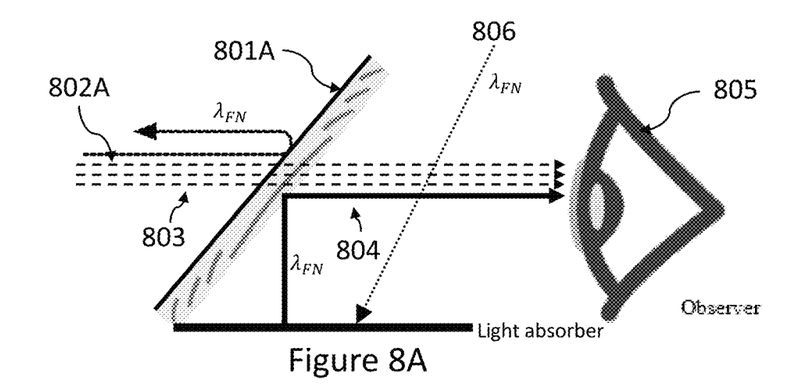
FIGS. 8A, 8B and 8C are schematic diagrams and graphs illustrating exemplary architecture and functionality of an MLTC according to embodiments of the present invention.
Figure 8B:
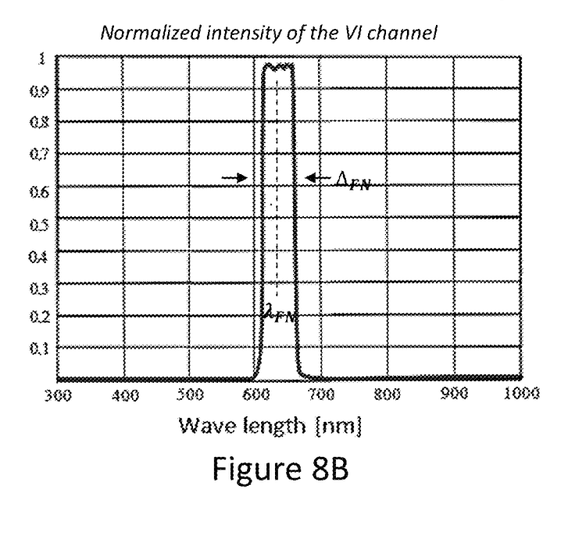
Figure 8C:
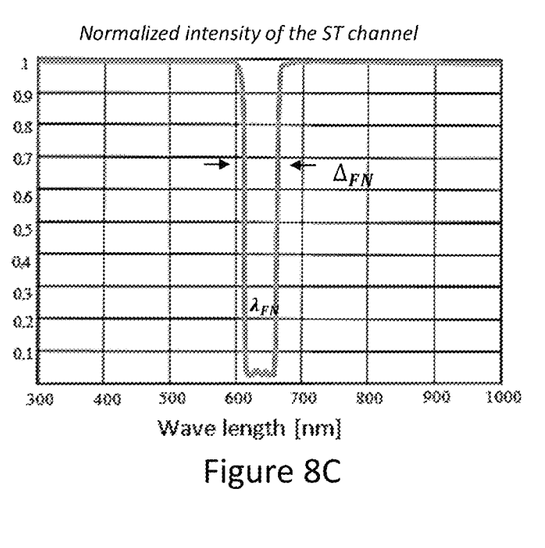

FIG. 8A proposes an exemplary 'gate keeper' technique for obviating discontinuities. In particular, FIG. 8A proposes the addition of a filter 801A applied to the external bounding surface of the window such that light 802A with bandwidth and central wavelength similar to that of the 'Floating Notch' filter (i.e., $\lambda_{FN}$) is blocked from being transmitted through the window. Accordingly, rather than attempt to conceal/hide discontinuities, the 'gate keeper' technique proposes a means by which the tint distribution in the ST channel is rendered uniform, in particular as other wavelengths of light 803 from the real-world scene (i.e., those different to the 'Floating Notch', which, in this arrangement, are configured to modulate only a narrow bandwidth of $\Delta\lambda_{FN}$ around wavelength $\lambda_{FN}$) are unaffected/unmodulated by the 'Floating Notch'. The resultant transmissivity of the VI channel and ST channel in this arrangement are shown in FIGS. 8B and 8C, where a portion of the ST channel about wavelength $\lambda_{FN}$ is blocked (i.e., by the external filter 801A) so as not to impede/disrupt the VI channel at this wavelength (i.e., in the form of discontinuities). Notably any stray light 806 (i.e., with wavelength $\lambda_{FN}$) which arises/exists from a source internally (i.e., that is not transmitted through the window via externally applied filter 801A) could expose the 'Floating Notch' discontinuities and should be blocked/diverted, for example by the use of a light absorber.

Figure 8D:
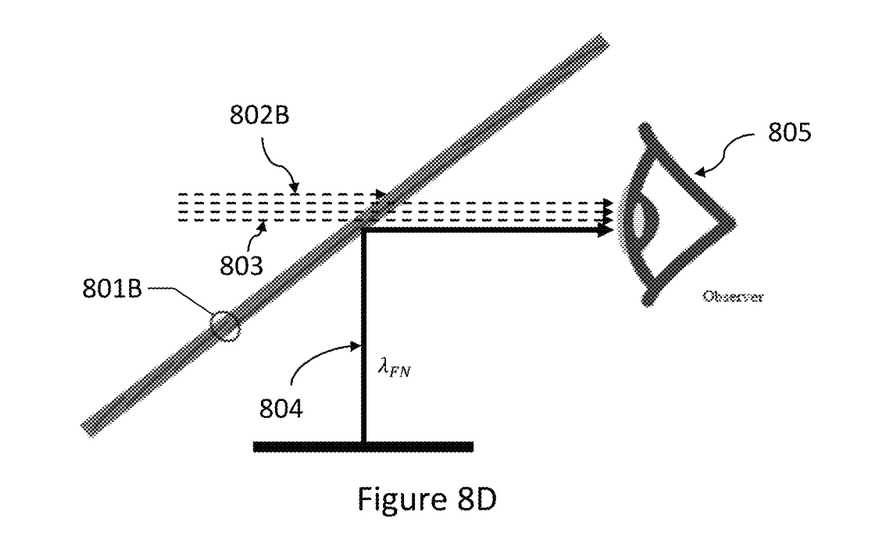
FIGS. 8D, 8E, and 8F are schematic diagrams and graphs illustrating exemplary architecture and functionality of an MLTC according to embodiments of the present invention.
Figure 8E:
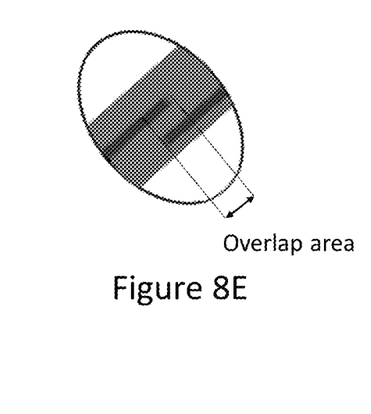
Figure 8F:
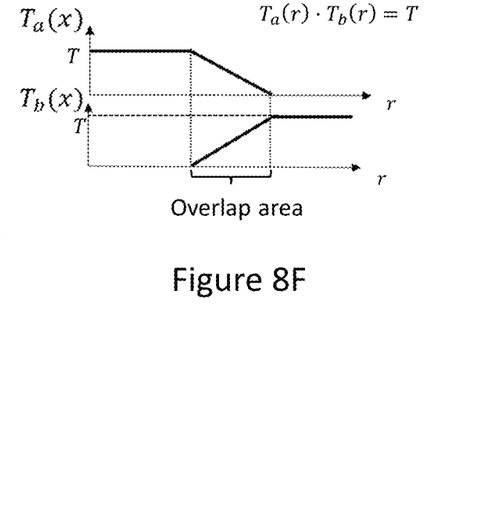

FIGS. 8D-8F propose an exemplary 'gradient transition' technique for obviating discontinuities. FIG. 8D proposes extending the active areas 801B in the multi-layered optical combiner to create an overlapping portion (i.e., as illustrated generally in FIG. 8E) in every pass between neighboring/consecutive partially reflective filter coating segments/portions. These overlapping portions are coated with a gradient configured such that as the transmissivity of the coating on one of the neighboring/consecutive segments, denoted $T_a(r)$, increases, the transmissivity of the coating applied to the other neighboring/consecutive segment, denoted $T_b(r)$, decreases (i.e., as illustrated generally in FIG. 8F). The uniformity of the scenery tint is thus preserved as the total transmissivity of the multi-layered optical combiner, denoted T, is preserved/uniform (i.e., T=constant) regardless of viewing angle. The multiplication of $T_a$ and $T_b$ is further uniform (i.e., $T_a(r) \cdot T_b(r) \sim T$) owing to rise and fall synchronicity in the transmissivities $T_a$ and $T_b$, respectively.

Advantageously, the optical path of modulated light from the internal surface 804 is reciprocal. This is to say that the user 805 may be able to interact and engage with virtual data 804 projected into his or her FOV. In some embodiments the virtual data 804 may include scene object dimensions, coordinates, bearings, timestamps, heat-maps, weather analysis, textual information about objects in the scene, and/or any other form of virtual data as would be apparent to those skilled in the art. Further, in some embodiments the virtual data 804 may be interacted or engaged with through gestures, such as through hand or facial gestures, through touch receptive elements in the transparent surface, and/or through any other means of interaction as would be apparent to those skilled in the art. In yet further embodiments, interaction or engagement with the modulated optical path may enable a user to scroll through data, to search or look up certain parameters, to switch between display modes, to highlight objects of interest, and/or to achieve any other form of interaction or engagement as would be apparent to those skilled in the art.

In sum, the exemplary OST AR arrangement of FIGS. 8A–8F enables a user 805 to maintain sight of a real-world view without any form of distortion or modification. The arrangement also allows a user 805 to perceive virtual data 804 seamlessly in alignment with the real-world view 803 and may further allow the user 805 to interact with the modulated reciprocal optical path. By applying the MLTC over the entire surface of the window, the exit pupil of the system is effectively stretched to cover the entire surface of the window thereby allowing the user 805 to see virtual data over the full surface. Furthermore, the user 805 may also perceive virtual data even when viewing the surface from larger angles of incidence, the EMB is significantly increased, and the requirement for gaze-tracking technology is now unnecessary.

According to some embodiments of the invention, the MLTC may be configured for adhesion to a transparent surface. In alternative embodiments, the MLTC may be laminated inside a transparent surface.

According to some embodiments of the invention, the transparent surface may be a window, windscreen, windshield, or any other transparent surface.

According to some embodiments of the invention, the MLTC may have a thickness of less than three millimeters. Preferably the MLTC may have a thickness of one millimeter or less.

According to some embodiments of the invention, the MLTC may further comprise an external secondary notch filter configured to block transmission of light with bandwidth and wavelength substantially equal to that of light modulated by the primary notch filter.

According to some embodiments of the invention, active areas in the MLTC may further comprise a partial overlap portion coated with a graduated notch filter, wherein two or more partial overlap portions are configured to align, when the connectable layers are connected, to form a composite overlap portion operable to transmit light with uniform transmissivity throughout said composite overlap portion.

According to some embodiments of the invention, the MLTC may be operable/configured to transmit light, irrespective of the viewing angle of a user, without perceptible geometrical discontinuities in the form of one or more of: optical vignetting, distortion and/or scattering.

According to some embodiments of the invention, a system is proposed for augmenting a real-world view with one or more virtual images, said system comprising: the MLTC, as described herein, positioned between a user and the real-world view; and a computer processing device operable to produce and emit, via a lens focused towards the effective aperture of said MLTC, overlay data for augmentation with said real-world view.

According to some embodiments of the invention there is further proposed a system, as aforementioned, wherein said MLTC is configured to: a) transmit said real-world view to said user without distortion or modification; and, b) modulate and align said overlay data with the undistorted and unmodified real-world view.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A multi-layered thin combiner (MLTC), comprising:
   a plurality of discrete connectable layers, each of said plurality of discrete connectable layers having a continuous area coated with a primary partially reflective filter;
   wherein each continuous area comprises a discrete fraction of an effective aperture of the MLTC;
   wherein the continuous areas are configured to align, when said plurality of discrete connectable layers are connected together into a multi-layered structure, to form a continuous composite coated area and collectively define the effective aperture; and
   wherein each of said continuous areas further comprises a partial overlap portion coated with a graduated partially reflective filter, and wherein two or more partial overlap portions are configured to align, when said discrete connectable layers are connected, to form a composite overlap portion operable to transmit light with uniform transmissivity throughout said composite overlap portion, the MLTC thereby being configured to merge a virtual image with a real-world image.

2. The MLTC according to claim 1, wherein said MLTC is adhered to a transparent surface.

3. The MLTC according to claim 2, wherein said transparent surface is a window, windscreen or windshield.

4. The MLTC according to claim 1, wherein said MLTC has a thickness of three millimeters or less.

5. The MLTC according to claim 1, wherein said MLTC further comprises a secondary partially reflective filter configured to block transmission of light with bandwidth and wavelength substantially equal to that of light modulated by the primary partially reflective filter,
   wherein the secondary partially reflective filter is applied externally to the MLTC.

6. A system for augmenting a real-world view with one or more virtual images, said system comprising:
   the MLTC according to any preceding claim positioned between a user and the real-world view; and
   a computer processing device operable to produce and emit, via a lens focused towards said effective aperture of said MLTC, overlay graphics for augmentation with said real-world view.

* * * * *